US009049148B1

(12) United States Patent
Singh (10) Patent No.: US 9,049,148 B1
(45) Date of Patent: Jun. 2, 2015

(54) DYNAMIC FORWARDING PLANE RECONFIGURATION IN A NETWORK DEVICE (71) Applicant: Juniper Networks, Inc., Sunnyvale, CA (US)

(72) Inventor: Ravi Singh, Burlingame, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 190 days.

(21) Appl. No.: 13/631,738

(22) Filed: Sep. 28, 2012

(51) Int. Cl.
*H04L 12/741* (2013.01)
*H04L 12/723* (2013.01)

(52) U.S. Cl.
CPC ............... *H04L 45/54* (2013.01); *H04L 45/50* (2013.01)

(58) Field of Classification Search
USPC .......................................................... 370/401
See application file for complete search history.

(56) References Cited

U.S. PATENT DOCUMENTS

| | | | |
|---|---|---|---|
| 5,600,642 A | 2/1997 | Pauwels et al. |
| 5,909,440 A | 6/1999 | Ferguson et al. |
| 6,047,331 A | 4/2000 | Medard et al. |
| 6,067,574 A | 5/2000 | Tzeng |
| 6,192,051 B1 | 2/2001 | Lipman et al. |
| 6,266,706 B1 | 7/2001 | Brodnik et al. |
| 6,359,858 B1 | 3/2002 | Smith et al. |
| 6,374,303 B1 | 4/2002 | Armitage et al. |
| 6,463,061 B1 | 10/2002 | Rekhter et al. |
| 6,477,166 B1 | 11/2002 | Sanzi et al. |
| 6,493,349 B1 | 12/2002 | Casey |
| 6,501,754 B1 | 12/2002 | Ohba et al. |
| 6,549,519 B1 | 4/2003 | Michels et al. |
| 6,553,002 B1 | 4/2003 | Bremer et al. |
| 6,553,028 B1 | 4/2003 | Tang et al. |
| 6,597,703 B1 | 7/2003 | Li et al. |

(Continued)

FOREIGN PATENT DOCUMENTS

| | | | |
|---|---|---|---|
| JP | 2005130258 A | 5/2005 |
| JP | 2005167482 A | 6/2005 |

(Continued)

OTHER PUBLICATIONS

Pan et al., "Fast Reroute Extensions to RSVP-TE for LSP Tunnels," RFC 4090, May 2005, 36 pp.

(Continued)

*Primary Examiner* — Michael Thier
*Assistant Examiner* — Yaotang Wang
(74) *Attorney, Agent, or Firm* — Shumaker & Sieffert, P.A.

(57) ABSTRACT

A network router dynamically reconfigures representations of forwarding structures used within a forwarding unit of the router. The forwarding structures comprise a plurality of forwarding next hops associated with the routes and stored in a first representation within the forwarding unit. The router further comprises a control unit having a processor to install the forwarding structures within the forwarding unit. In response to input directing the router to change from a first operating mode to a second operating mode, the control unit installs, within the forwarding unit, one or more new forwarding next hops that are associated with none of the routes by the forwarding structures and are stored in a second representation within the forwarding unit that is different from the first representation and, after installing the new forwarding next hop, updates the forwarding structures to associate at least one of the routes to the new forwarding next hop.

16 Claims, 5 Drawing Sheets

(56) References Cited

U.S. PATENT DOCUMENTS

| | | |
|---|---|---|
| 6,611,528 B1 | 8/2003 | Farinacci et al. |
| 6,618,760 B1 | 9/2003 | Aramaki et al. |
| 6,625,773 B1 | 9/2003 | Boivie et al. |
| 6,643,706 B1 | 11/2003 | Marques et al. |
| 6,665,297 B1 | 12/2003 | Hariguchi et al. |
| 6,693,878 B1 | 2/2004 | Daruwalla et al. |
| 6,731,652 B2 | 5/2004 | Ramfelt et al. |
| 6,744,774 B2 | 6/2004 | Sharma |
| 6,751,218 B1 | 6/2004 | Hagirahim et al. |
| 6,778,531 B1 | 8/2004 | Kodialam et al. |
| 6,807,182 B1 | 10/2004 | Dolphin et al. |
| 6,847,645 B1 | 1/2005 | Potter et al. |
| 6,857,026 B1 | 2/2005 | Cain |
| 6,859,455 B1 | 2/2005 | Yazdani et al. |
| 6,879,594 B1 | 4/2005 | Lee et al. |
| 6,888,838 B1 | 5/2005 | Ji et al. |
| 6,906,998 B1 | 6/2005 | Mujeeb et al. |
| 6,920,503 B1 | 7/2005 | Nanji et al. |
| 6,976,154 B1 | 12/2005 | Dyckerhoff et al. |
| 6,999,468 B2 | 2/2006 | Lund et al. |
| 7,016,379 B2 | 3/2006 | Falkenstein et al. |
| 7,035,226 B2 | 4/2006 | Enoki et al. |
| 7,039,687 B1 | 5/2006 | Jamieson et al. |
| 7,058,725 B2 | 6/2006 | Mathew et al. |
| 7,061,911 B2 | 6/2006 | Furuno |
| 7,082,102 B1 | 7/2006 | Wright |
| 7,088,717 B2 | 8/2006 | Reeves et al. |
| 7,133,928 B2 | 11/2006 | McCanne |
| 7,184,437 B1 | 2/2007 | Cole et al. |
| 7,251,218 B2 | 7/2007 | Jorgensen |
| 7,269,135 B2 | 9/2007 | Frick et al. |
| 7,281,058 B1 | 10/2007 | Shepherd et al. |
| 7,325,071 B2 | 1/2008 | Krishnan |
| 7,330,468 B1 | 2/2008 | Tse-Au |
| 7,333,491 B2 | 2/2008 | Chen et al. |
| 7,359,328 B1 | 4/2008 | Allan |
| 7,360,084 B1 | 4/2008 | Hardjono |
| 7,366,894 B1 | 4/2008 | Kalimuthu et al. |
| 7,418,003 B1 | 8/2008 | Alvarez et al. |
| 7,447,149 B1 | 11/2008 | Beesley et al. |
| 7,463,591 B1 | 12/2008 | Kompella et al. |
| 7,477,642 B2 | 1/2009 | Aggarwal et al. |
| 7,483,439 B2 | 1/2009 | Shepherd et al. |
| 7,512,080 B1 | 3/2009 | Kompella et al. |
| 7,519,010 B1 | 4/2009 | Aggarwal et al. |
| 7,522,599 B1 | 4/2009 | Aggarwal et al. |
| 7,522,600 B1 | 4/2009 | Aggarwal et al. |
| 7,532,624 B2 | 5/2009 | Ikegami et al. |
| 7,545,735 B1 | 6/2009 | Shabtay et al. |
| 7,558,199 B1 | 7/2009 | Minei et al. |
| 7,558,219 B1 | 7/2009 | Aggarwal et al. |
| 7,558,263 B1 | 7/2009 | Aggarwal et al. |
| 7,564,803 B1 | 7/2009 | Minei et al. |
| 7,564,806 B1 | 7/2009 | Aggarwal et al. |
| 7,564,841 B2 | 7/2009 | Wybenga et al. |
| 7,567,512 B1 | 7/2009 | Minei et al. |
| 7,570,604 B1 | 8/2009 | Aggarwal et al. |
| 7,570,605 B1 | 8/2009 | Aggarwal et al. |
| 7,590,115 B1 | 9/2009 | Aggarwal et al. |
| 7,590,760 B1 * | 9/2009 | Banks et al. ................... 709/248 |
| 7,599,284 B1 * | 10/2009 | Di Benedetto et al. ....... 370/216 |
| 7,602,702 B1 | 10/2009 | Aggarwal |
| 7,606,235 B1 | 10/2009 | Ayyangar et al. |
| 7,649,904 B1 | 1/2010 | Ghosh et al. |
| 7,742,482 B1 | 6/2010 | Aggarwal |
| 7,746,790 B1 | 6/2010 | Cole et al. |
| 7,787,380 B1 | 8/2010 | Aggarwal et al. |
| 7,814,185 B2 | 10/2010 | Choe |
| 7,830,787 B1 | 11/2010 | Wijnands et al. |
| 7,839,862 B1 | 11/2010 | Aggarwal |
| 7,860,104 B1 | 12/2010 | Aggarwal |
| 7,903,658 B1 | 3/2011 | Kireeti et al. |
| 7,933,267 B1 | 4/2011 | Aggarwal et al. |
| 7,936,780 B1 | 5/2011 | Kompella |
| 7,940,698 B1 | 5/2011 | Minei |
| 7,957,386 B1 | 6/2011 | Aggarwal et al. |
| 7,983,261 B1 | 7/2011 | Aggarwal et al. |
| 7,990,963 B1 | 8/2011 | Aggarwal et al. |
| 7,990,965 B1 | 8/2011 | Aggarwal et al. |
| 7,990,993 B1 * | 8/2011 | Ghosh et al. ................... 370/428 |
| 8,014,293 B1 | 9/2011 | Cole et al. |
| 8,018,944 B1 | 9/2011 | Kopelman et al. |
| 8,050,559 B2 | 11/2011 | Sindhu |
| 8,068,492 B1 | 11/2011 | Aggarwal et al. |
| 8,077,726 B1 | 12/2011 | Kumar et al. |
| 8,111,633 B1 | 2/2012 | Aggarwal et al. |
| 8,121,056 B1 | 2/2012 | Aggarwal et al. |
| 8,160,076 B1 | 4/2012 | Aggarwal et al. |
| 8,189,576 B2 | 5/2012 | Ferguson et al. |
| 8,259,564 B1 | 9/2012 | Gredler et al. |
| 2001/0028651 A1 | 10/2001 | Murase |
| 2002/0071390 A1 | 6/2002 | Reeves et al. |
| 2002/0109879 A1 | 8/2002 | Wing So |
| 2002/0112072 A1 | 8/2002 | Jain |
| 2002/0118644 A1 | 8/2002 | Moir |
| 2002/0143747 A1 | 10/2002 | Tal et al. |
| 2002/0181477 A1 | 12/2002 | Mo et al. |
| 2002/0186664 A1 | 12/2002 | Gibson et al. |
| 2002/0191584 A1 | 12/2002 | Korus et al. |
| 2003/0012215 A1 | 1/2003 | Novaes |
| 2003/0021282 A1 | 1/2003 | Hospodor |
| 2003/0031167 A1 | 2/2003 | Singh et al. |
| 2003/0031175 A1 | 2/2003 | Hayashi et al. |
| 2003/0043772 A1 | 3/2003 | Mathis et al. |
| 2003/0063591 A1 | 4/2003 | Leung et al. |
| 2003/0087653 A1 | 5/2003 | Leung et al. |
| 2003/0088696 A1 | 5/2003 | McCanne |
| 2003/0091043 A1 | 5/2003 | Mehrotra et al. |
| 2003/0099218 A1 | 5/2003 | Tillotson |
| 2003/0099235 A1 | 5/2003 | Shin et al. |
| 2003/0108047 A1 | 6/2003 | Mackiewich et al. |
| 2003/0112748 A1 | 6/2003 | Puppa et al. |
| 2003/0123446 A1 | 7/2003 | Muirhead et al. |
| 2003/0172114 A1 | 9/2003 | Leung |
| 2003/0177221 A1 | 9/2003 | Ould-Brahim et al. |
| 2003/0179742 A1 | 9/2003 | Ogier et al. |
| 2003/0198234 A1 | 10/2003 | Pin |
| 2003/0210705 A1 | 11/2003 | Seddigh et al. |
| 2003/0235152 A1 | 12/2003 | Shibasaki |
| 2003/0235195 A1 * | 12/2003 | Shenoy et al. ................ 370/389 |
| 2004/0037279 A1 | 2/2004 | Zelig et al. |
| 2004/0042406 A1 | 3/2004 | Wu et al. |
| 2004/0047342 A1 | 3/2004 | Gavish et al. |
| 2004/0078625 A1 | 4/2004 | Rampuria et al. |
| 2004/0081154 A1 | 4/2004 | Kouvelas |
| 2004/0151180 A1 | 8/2004 | Hu et al. |
| 2004/0151181 A1 | 8/2004 | Chu et al. |
| 2004/0165600 A1 | 8/2004 | Lee |
| 2004/0190517 A1 | 9/2004 | Gupta et al. |
| 2004/0205229 A1 | 10/2004 | Stojancic |
| 2004/0213160 A1 | 10/2004 | Regan et al. |
| 2004/0218536 A1 | 11/2004 | Yasukawa et al. |
| 2004/0240446 A1 | 12/2004 | Compton et al. |
| 2005/0001720 A1 | 1/2005 | Mason et al. |
| 2005/0013295 A1 | 1/2005 | Regan et al. |
| 2005/0018693 A1 | 1/2005 | Dull |
| 2005/0025156 A1 | 2/2005 | Smathers |
| 2005/0027782 A1 | 2/2005 | Jalan et al. |
| 2005/0097203 A1 | 5/2005 | Unbehagen et al. |
| 2005/0108419 A1 | 5/2005 | Eubanks |
| 2005/0111351 A1 | 5/2005 | Shen |
| 2005/0129001 A1 | 6/2005 | Backman et al. |
| 2005/0169270 A1 | 8/2005 | Mutou et al. |
| 2005/0195831 A1 | 9/2005 | Wybenga et al. |
| 2005/0220132 A1 | 10/2005 | Oman et al. |
| 2005/0232193 A1 | 10/2005 | Jorgensen |
| 2005/0262232 A1 | 11/2005 | Cuervo et al. |
| 2005/0265308 A1 | 12/2005 | Barbir et al. |
| 2005/0271035 A1 | 12/2005 | Cohen et al. |
| 2005/0271036 A1 | 12/2005 | Cohen et al. |
| 2005/0276215 A1 | 12/2005 | Kitani et al. |
| 2005/0281192 A1 | 12/2005 | Nadeau et al. |
| 2006/0013141 A1 | 1/2006 | Mutoh et al. |
| 2006/0039364 A1 | 2/2006 | Wright |

(56) References Cited

U.S. PATENT DOCUMENTS

| | | |
|---|---|---|
| 2006/0047851 A1 | 3/2006 | Voit et al. |
| 2006/0088031 A1 | 4/2006 | Nalawade |
| 2006/0126496 A1 | 6/2006 | Filsfils et al. |
| 2006/0147204 A1 | 7/2006 | Yasukawa et al. |
| 2006/0153067 A1 | 7/2006 | Vasseur et al. |
| 2006/0164975 A1 | 7/2006 | Filsfils et al. |
| 2006/0182034 A1 | 8/2006 | Klinker et al. |
| 2006/0221958 A1 | 10/2006 | Wijnands et al. |
| 2007/0036162 A1 | 2/2007 | Tingle et al. |
| 2007/0076709 A1 | 4/2007 | Mattson et al. |
| 2007/0098003 A1 | 5/2007 | Boers et al. |
| 2007/0104119 A1 | 5/2007 | Sarkar et al. |
| 2007/0124454 A1 | 5/2007 | Watkinson |
| 2007/0140107 A1 | 6/2007 | Eckert et al. |
| 2008/0056258 A1 | 3/2008 | Sharma et al. |
| 2008/0123524 A1 | 5/2008 | Vasseur et al. |
| 2008/0123654 A1 | 5/2008 | Tse-Au |
| 2008/0291921 A1 | 11/2008 | Du et al. |
| 2009/0028149 A1 | 1/2009 | Yasukawa et al. |
| 2010/0296517 A1 | 11/2010 | Kompella |
| 2012/0045206 A1 | 2/2012 | Sindhu |
| 2012/0275459 A1 | 11/2012 | Ferguson et al. |

FOREIGN PATENT DOCUMENTS

| | | |
|---|---|---|
| JP | 2005252385 A | 9/2005 |
| KR | 2004001206 | 1/2004 |
| WO | 02/091670 A2 | 11/2002 |
| WO | 2004/071032 A1 | 8/2004 |

OTHER PUBLICATIONS

Awduche et al., RFC 3209, "RSVP-TE: Extensions to RSVP for LSP Tunnels," Network Working Group, Dec. 2001, 57 pp.

Awduche et al., "RSVP-TE: Extensions to RSVP for LSP Tunnels," IETF, Dec. 2001, pp. 1-57.

RSVP-TE: Resource Reservation Protocol—Traffic Extension, Javvin Company, 2 pp., printed Apr. 18, 2005. http://www.javvin.com/protocolRSVPTE.html.

Zhang, "A Destination-initiated Multicast Routing Protocol for Shortest Path Tree Constructions," GLOBECOM 2003, IEEE Global Telecommunications Conference, XP010677629, pp. 2840-2844.

Rosen et al., "Multicast in MPLS/BGP IP VPNs," draft-rosen-vpn-mcast-07.txt, May 2004, 27 pp.

Deering et al., "Protocol Independent Multicast-Sparse Mode (PIM-SM): Motivation and Architecture," draft-ietf-idmr-pim-arch-05.txt, Aug. 4, 1998, 30 pp.

Martini et al., "Transport of Layer 2 Frames Over MPLS," Network Working Group Internet Draft, draft-martini-l2circuit-trans-mpls-08.txt, Nov. 2001, 18 pp.

Martini et al., "Encapsulation Methods for Transport of Layer 2 Frames Over IP and MPLS Networks," Network Working Group Internet Draft, draft-martini-l2circuit-encap-mpls-04.txt, Nov. 2001, 17 pp.

Aggarwal et al., "MPLS Upstream Label Assignment and Context Specific Label Space," Network Working Group Internet Draft, draft-raggarwa-mpls-upstream-label-00.txt, Jan. 2005, 9 pp.

Wijnands et al., "Multicast Extensions for LDP," Network Working Group Internet Draft, draft-wijnands-mpls-ldp-mcast-ext-00.txt, Mar. 2005, 13 pp.

Aggarwal et al., "Establishing Point to Multipoint MPLS TE LSPs," IETF, Aug. 2004, 15 pp.

Yasukawa et al., "Requirements for Point to Multipoint extension to RSVP-TE," IETF, Oct. 2003, pp. 1-20.

Atlas et al., "MPLS RSVP-TE Interoperability for Local Protection/Fast Reroute," IETF, Jul. 2001, pp. 1-14.

Le Roux et al., "Fast Reroute in MPLS L3VPN networks Towards CE-to-CE Protection," www.mpls2006.com, 2006, 10 pp.

Satyanarayana et al., "Extensions to GMPLS RSVP Graceful Restart", draft-aruns-ccamp-restart-ext-01.txt, Jul. 2004, Network Working Group Internet Draft, 23 pp.

Aggarwal et al., "MPLS Upstream Label Assignment for RSVP-TE and LDP," Aug. 24, 2005, http://www.tla-group.com/~mpls/ietf-63-mpls-upstream-rsvp-ldp.ppt, 8 pp.

U.S. Appl. No. 10/045,717, by Kireeti Kompella, filed Oct. 19, 2001.

U.S. Appl. No. 13/315,119, by Nittin Kumar, filed Dec. 8, 2011.

U.S. Appl. No. 11/778,921, by Pradeep Sindhu, filed Jul. 17, 2007.

U.S. Appl. No. 12/574,428, by Rahul Aggarwal, filed Oct. 6, 2009.

* cited by examiner

DYNAMIC FORWARDING PLANE RECONFIGURATION IN A NETWORK DEVICE

TECHNICAL FIELD

The invention relates to packet-based computer networks and, more particularly, to forwarding packets within computer networks.

BACKGROUND

A computer network is a collection of interconnected computing devices that can exchange data and share resources. Example network devices include layer two devices that operate within the second layer of the Open Systems Interconnection (OSI) reference model, i.e., the data link layer, and layer three devices that operate within the third layer of the OSI reference model, i.e., the network layer. Network devices within computer networks often include a control unit that provides control plane functionality for the network device and forwarding components for routing or switching data units. In some cases, for example, a network device may include a plurality of packet forwarding engines (PFEs) and a switch fabric that collectively provide a forwarding plane for forwarding network traffic.

The control plane functions provided by the control unit include storing network topologies in the form of a routing information base (RIB), executing routing protocols to communicate with peer routing devices to maintain and update the RIB, and providing a management interface to allow user access and configuration of the network device. The control unit maintains routing information that represents the overall topology of the network and defines routes to destination prefixes within the network.

The control unit derives a forwarding information base (FIB) that includes a number of forwarding structures generated by the control unit in accordance with the routing information and control information. The control unit installs the forwarding structures within the data plane to programmatically configure the forwarding components. The data and instructions that constitute the forwarding structures define an internal forwarding path for each incoming packet received by the network device. For example, to generate a route-table-lookup forwarding structure, the control unit selects routes defined by the network topology and maps packet key information (e.g., destination information and other select information from a packet header) to one or more specific next hop network devices and ultimately to one or more specific output interfaces of interface cards of the network device. In some cases, the control unit may install the forwarding structures into each of the PFEs to update the FIB within each of the PFEs and control traffic forwarding within the data plane. Bifurcating control and data plane functionality allows the FIB in each of PFEs to be updated without degrading packet forwarding performance of the network device.

In some cases, a user may desire to dynamically reconfigure certain characteristics of a forwarding plane of a network router in real-time, i.e., while the router remains in operation. For example, in some situations a user may wish to change the forwarding plane from one type of paradigm for organizing forwarding structures to another altogether. Modifications of the data plane are usually accompanied by significant signaling from the control plane, which may lead to undesirable packet loss or duplication or require taking the network router offline.

SUMMARY

In general, this disclosure describes techniques for dynamic reconfiguration of forwarding structures used within a forwarding plane of a router while reducing or minimizing signaling from a control plane of the router with neighboring routers.

In one embodiment, a method comprises installing, within a forwarding unit of a router, forwarding structures for forwarding packets in accordance with routing information for routes through a network. The forwarding structures comprise a plurality of forwarding next hops that are associated with the routes and are stored in a first representation within the forwarding unit. The method further comprises, while forwarding the packets with the forwarding unit in accordance with the forwarding structures, installing, within the forwarding unit, one or more new forwarding next hops that are associated with none of the routes by the forwarding structures and are stored within the forwarding unit in a second representation that is different from the first format. After installing the new forwarding next hop within the forwarding unit, the forwarding structures are updated to associate at least one of the routes to the new forwarding next hop.

In another embodiment, a router comprises a forwarding unit to forward packet in accordance with forwarding structures programmed into a memory in accordance with routing information for routes through a network. The forwarding structures comprise a plurality of forwarding next hops associated with the routes and stored in a first representation within the forwarding unit. The router further comprises a control unit having a processor to install the forwarding structures within the forwarding unit. In response to input directing the router to change from a first operating mode to a second operating mode, the control unit installs, within the forwarding unit, one or more new forwarding next hops that are associated with none of the routes by the forwarding structures and are stored in a second representation within the forwarding unit that is different from the first representation and, after installing the new forwarding next hop, updates the forwarding structures to associate at least one of the routes to the new forwarding next hop.

In another embodiment, the invention is directed to a computer-readable medium containing instructions. The instructions cause a programmable processor to install, within a forwarding unit of a router, forwarding structures for forwarding packets in accordance with routing information for routes through a network. The forwarding structures comprise a plurality of forwarding next hops that are associated with the routes and are stored in a first representation within the forwarding unit. The instructions further cause the processor to install, within the forwarding unit, one or more new forwarding next hops that are associated with none of the routes by the forwarding structures and are stored in a second representation within the forwarding unit that is different from the first format. After installing the new forwarding next hop within the forwarding unit, the forwarding structures are updated to associate at least one of the routes to the new forwarding next hop.

The invention may provide certain advantages. For example, the techniques may allow dynamic reconfiguration of the forwarding structures used within the forwarding plane while reducing or minimizing signaling from the control plane. As another example, the techniques may provide for reconfiguration of forwarding structures, even wholesale changes in the manner in which operational forwarding structures are stored, with little or no disruption of packet forwarding or packet data loss. As such, in some situations neighboring routers may not even realize that the forwarding structures within a given router within the network have changed.

The details of one or more embodiments of the invention are set forth in the accompanying drawings and the description below.

DETAILED DESCRIPTION

Figure 1:
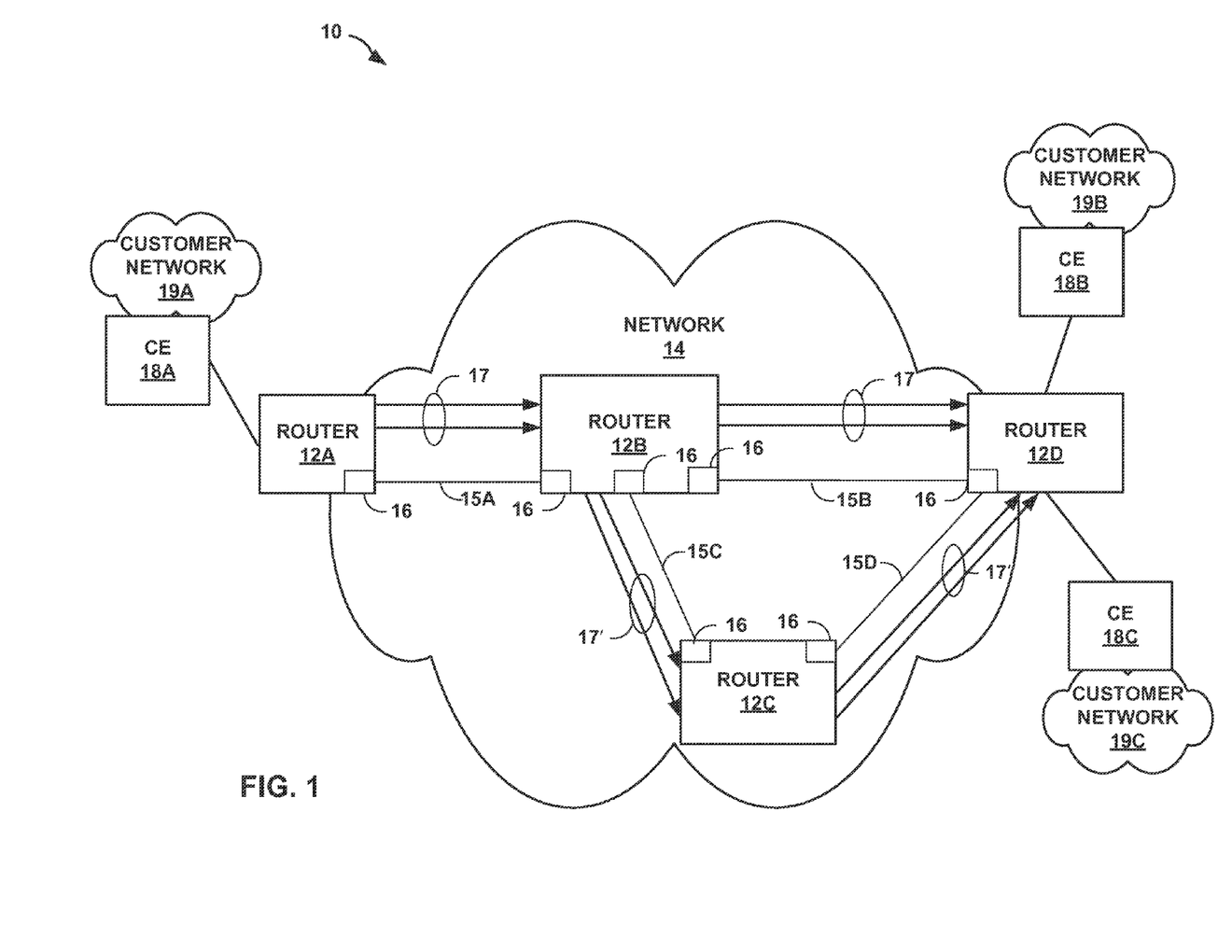
FIG. 1 is a block diagram illustrating an example network in which one or more routers operates in accordance with the techniques described herein.

FIG. 1 is a block diagram illustrating an example system 10 in which one or more routers 12A-12D ("routers 12") of network 14 operate in accordance with the description herein. In the illustrated example of FIG. 1, routers 12A and 12D are edge routers of a network 14, which may be administered by a network service provider, and provide connectivity for customer networks 19A-19C ("customer networks 19"). In this example, edge routers 12A and 12D are coupled to customer edge (CE) routers 18A-18C ("CE routers 18") of customer networks 19 via access links. Edge routers 12A and 12D communicate with CE routers 18 to provide customer networks 19 with access to network 14.

As shown, each of customer networks 19 may be a network for a site of an enterprise. Each of customer networks 19 may include one or more computing devices (not shown), such as personal computers, laptop computers, handheld computers, workstations, servers, switches, printers, or other devices. Network 14 may be a service provider network coupled to one or more networks administered by other service providers, and may thus form part of a large-scale public network infrastructure, e.g., the Internet. Consequently, customer networks 19 may be viewed as edge networks of the Internet. The service provider may provide computing devices within customer networks 19 with access to the Internet via network 14, which allows computing devices within one of customer networks 19 to communicate with computing devices within the Internet or the other one of customer networks 19. FIG. 1 may be a simplified view of network 14. Network 14 may include a variety of other network devices (not shown), such as routers, switches, servers, and the like and may be connected to other networks.

In this example, routers 12A-12D are connected to one another by physical links 15A-15D (collectively, "physical links 15") coupled to routers 12A-12D by interface ports 16. For example, physical link 15A couples router 12A to 12B. The physical links 15 may be a physical medium, such as a copper wire, a coaxial cable, any of a host of different fiber optic lines, or a wireless connection. Network 14 may be a Multi-protocol Label Switched Network (MPLS) that has been traffic engineered to include multiple label switched paths (LSPs) 17 for controlling the flow of traffic through network 14. For example, a plurality of LSPs 17 may be established within network 14 using the Resource Reservation Protocol with Traffic Engineering extensions (RSVP-TE), and each LSP represents an RSVP-TE tunnel carrying traffic from CE 18A or other sources (not shown) such as other customer networks. For example, LSPs 17 may be used to carry communications from customer network 19A to customer networks 19B, 19C in the form of MPLS encapsulated packets that enter the LSPs at ingress router 12A and exit the LSPs at egress router 12D. In some examples, tens or hundreds of LSPs 17 may be configured to flow through routers 12 of network 14. In some aspects, some of LSPs 17 may be established as point-to-multipoint (P2MP) LSPs, as described in application Ser. No. 11/056,383, filed on Feb. 10, 2005, entitled FAST REROUTE OF TRAFFIC ASSOCIATED WITH A POINT TO MULTI-POINT NETWORK TUNNEL, the entire contents of which is incorporated herein by reference.

In the example of FIG. 1, LSP 17 extends from router 12A (an ingress) to router 12B to router 12D (an egress). Further, backup LSP tunnels 17' extend from router 12B to router 12C to router 12D, thereby providing alternative tunnels for traffic flow. In some cases, a backup LSP tunnel 17' may merge back into the LSP 17. Although the LSPs 17 are illustrated in FIG. 1 as delivering the traffic from the direction of router 12A to router 12D, additional LSPs not shown may be established within network 14 for delivering the traffic in the opposite direction. Moreover, multiple LSPs 17 may be established over a single physical link 15, which may be useful for carrying traffic originating from different sources or traffic of different type or quality of service. In the event of link or node failure, e.g. failure of physical link 15B, traffic flowing through LSPs 17 may be switched to a corresponding backup LSP tunnels 17' associated with a different link 15C to minimize traffic loss.

In order to maintain an accurate representation of the network 14, routers 12 exchange routing information using control-plane signaling in accordance with one or more defined protocols, such as the Border Gateway Protocol (BGP). When routers of different autonomous systems use BGP to exchange information, the protocol is referred to as External BGP (EBGP). When routers within an autonomous system use BGP to exchange routing information, the protocol is referred to as Internal BGP (IBGP). Another example protocol for exchanging routing information is the Intermediate System to Intermediate System protocol (ISIS), which is an interior gateway routing protocol for IP networks for communicating link-state information within an autonomous system. Other examples of interior routing protocols include the Open Shortest Path First (OSPF), and the Routing Information Protocol (RIP).

When two of routers 12 initially connect, they typically exchange all of their routing information. The routers 12 send control messages to incrementally update the routing information when the network topology changes. For example, the routers 12 may send update routing protocol messages to advertise newly available routes and to withdraw routes that are no longer available. Routers 12 may maintain the routing information in the form of one or more routing tables or other data structures. The form and contents of the routing tables depends on the routing algorithm implemented by the routers 12. Furthermore, as described in further detail below, routers 12 generate and maintain forwarding information in accordance with the routing information. The forwarding information associates network routes with specific forwarding next hops and corresponding interface ports of the router 12. The forwarding information may, therefore, be thought of as a subset of the information contained within routing information. The process of generating the forwarding information is generally referred to as route resolution.

As further explained herein, there may be situations where an operator of network 14 may desire to switch between different paradigms or constructs by which forwarding structures are stored within a forwarding plane of one or more of routers 12, such as router 12B. Some constructs for storing forwarding structures within forwarding hardware may be better suited for scalability while other constructs may be better suited for network manageability, such as real-time traffic monitoring and statistic gathering and analysis.

In accordance with the techniques described herein, one or more of routers 12, e.g., router 12B, incorporates functionality that allows for dynamic reconfiguration of forwarding structures used within a forwarding plane while reducing or minimizing signaling from a control plane of the router with neighboring routers. The functionality may provide for reconfiguration of forwarding structures, even wholesale changes in the manner in which operational forwarding structures are stored, with little or no disruption of packet forwarding or packet data loss within network 14. As such, in some situations neighboring routers 12A, 12C and 12D may not even realize that the forwarding structures within router 12B, for example, have changed.

As one example, different constructs for forwarding structures in a data plane of router 12B may provide certain advantages with respect to LSPs 17, for example, handling of remerges and crossovers of LSPs 17 within network 14. Different types of representations for forwarding structures may be used within the forwarding hardware of router 12B to represent the label swapping and next hop operations associated with LSPs 17. However, each different type of paradigm for storing the forwarding structures associates with LSPs 17 may provide unique advantages and disadvantages. As discussed herein, router 12B allows an operator of network 14 to dynamically reconfigure the forwarding plane of router 12B to smoothly transition to a different construct for storing forwarding structures without disrupting flow of MPLS traffic on LSPs 17.

In another example, an operator of network 14 may perform an in-service software upgrade (ISSU) of router 12B, where the software upgrade supports one or more different or additional type of forwarding structures within the forwarding plane. In accordance with the techniques described herein, the operator may continue to utilize the current forwarding structures of router 12B and switch to the new forwarding structures at a future point in time such that when such as switch is made it is accomplished without disrupting packet flow and packet loss.

As another example, router 12B may automatically utilize the techniques described herein to dynamically switch between different representations for storing forwarding structures in real-time based on conditions, such as available memory or network congestion. For example, in the event router 12B is experiencing low available memory or other resources, a control process executing on the router may automatically initiate a transition to use of forwarding structures that conserve memory within the forwarding plane.

As one example embodiment, forwarding hardware within router 12B supports a first mode in which next hops are programmed within forwarding integrated circuits of the forwarding plane as "flat" next hops. That is, separate and distinct forwarding state for each LSP 17 is stored within the memory of the forwarding integrated circuits. The forwarding structure, i.e., forwarding next hop, for each LSP defines the label swapping and other operations necessary to forward traffic for the corresponding LSP, but the forwarding state is uniquely associated with the corresponding LSP. As such, utilization of flat next hops for forwarding structures within the forwarding plane may utilize more high-speed internal memory of the forwarding chips, but may be more amenable to fine-grain traffic monitoring and statistic generation for individual LSPs 17 or routes.

In addition, router 12B supports a second mode in which the next hop for each LSP is stored as composite next hops. As composite next hops, the internal label swapping and other operations associated with forwarding traffic for a given LSP is broken out as a series of operations, where each operation is "linked" to the next operation in memory by a reference or other data structure. Moreover, identical operations for composite next hops are extracted and stored in a single location within the internal memory of the forwarding integrated circuits. As such, utilization of a composite next hops for forwarding structures within the forwarding plane may not be well suited for fine-grain traffic monitoring and statistic generation for individual LSPs 17 or routes, but utilize less high-speed internal memory of the forwarding chips As described herein, in one example, a control plane of router 12B provides a user interface that allows the operator or network management software associated with network 14 to seamlessly transition between the first mode in which flat next hops are used within the forwarding chips and the second mode in which composite next hops are used. For example, the control plane may dynamically program the forwarding chips to build the appropriate forwarding structures and incrementally transition certain routes to the desired forwarding constructs. The control plane may initiate a form of handshake with the forwarding plane and require signaling of internal acknowledgements as the new constructs are built. The control plane continues with the controlled process until all of the routes have been transitioned to the desired forwarding constructs. In this way, the functionality may provide for reconfiguration of forwarding structures, even wholesale changes in the manner in which operational forwarding structures are stored, with little or no disruption of packet forwarding or packet data loss within network 14.

The configuration of the network environment illustrated in FIG. 1 is merely exemplary. For example, service provider network 14 may include any number of provider edge routers coupled to one or more customer networks. Nonetheless, for ease of description, only customer networks 19A-19C are illustrated in FIG. 1. As another example, router 12B may be associated with a greater number of LSPs than shown in FIG. 1.

Figure 2:
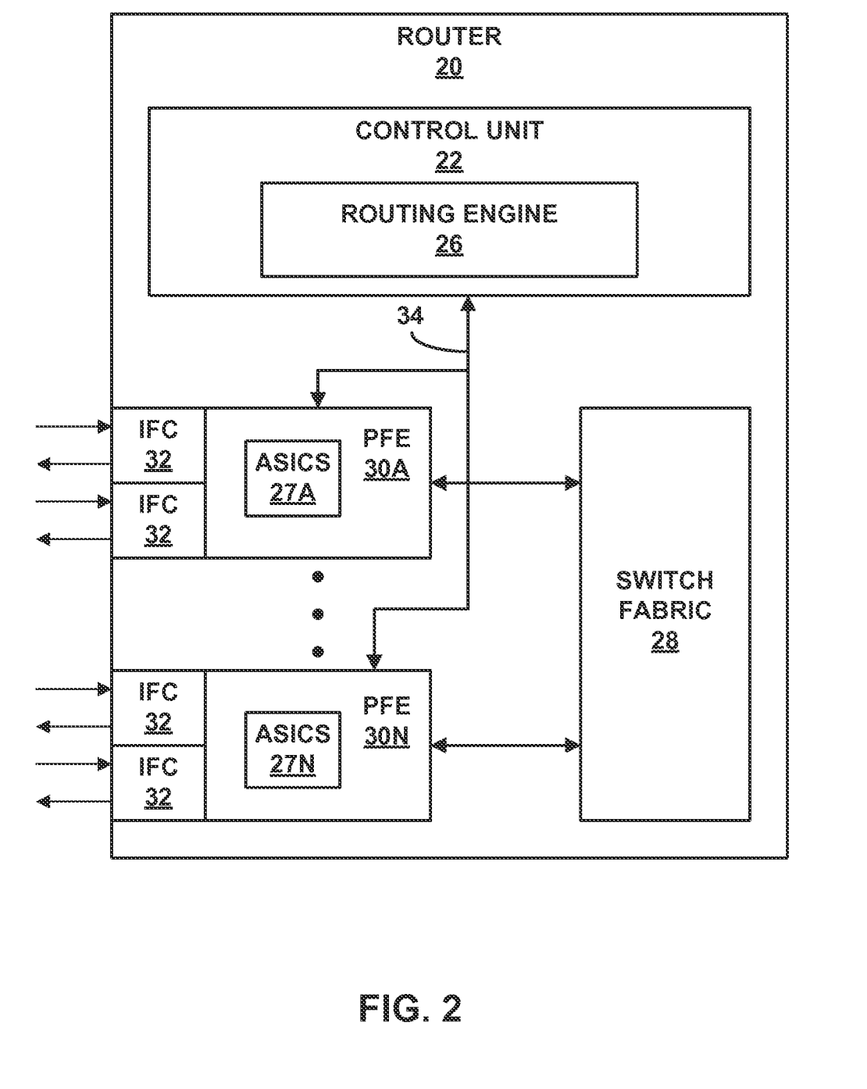
FIG. 2 is a block diagram illustrating an example embodiment of the network device of FIG. 1 in further detail.

FIG. 2 is a block diagram illustrating an example router 20 that creates forwarding structures to be installed in a forwarding plane in accordance with the principles described herein. Router 20 may comprise a router such as one of routers 12, a core router, an edge router, a gateway or other network device. In this example, router 20 includes a control unit 22 that includes a routing engine 26 that provides control plane functionality for router 20. Router 20 also includes a plurality of packet-forwarding engines 30A-30N ("PFEs 30") and a switch fabric 28 that collectively provide a data plane for forwarding network traffic. PFEs 30 receive and send data packets via interface cards 32 ("IFCs 32"). In other embodiments, each of PFEs 30 may comprise more or fewer IFCs. Although not shown, PFEs 30 may each comprise a central processing unit (CPU) and a memory. Switch fabric 28 provides a high-speed interconnect for forwarding incoming data packets to the correct one of PFEs 30 for transmission over a network. U.S. Patent Application 2008/0044181, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application 2008/0044181 are incorporated herein by reference.

Routing engine 26 provides control plane functions for storing network topology in the form of routing tables or other structures, executing routing protocols to communicate with peer routing devices and maintain and update the routing tables, and providing a management interface to allow user access and configuration of router 20. Control unit 22 provides an operating environment for routing engine 26 and may be implemented solely in software, or hardware, or may be implemented as a combination of software, hardware or firmware. For example, control unit 22 may include one or more processors which execute software instructions. In that case, routing engine 26 may include various software modules or daemons (e.g., one or more routing protocol processes, user interfaces and the like), and control unit 22 may include a computer-readable storage medium, such as computer memory or hard disk, for storing executable instructions.

In this example, routing engine 26 is connected to each of PFEs 30 by a dedicated internal communication link 34. For example, dedicated link 34 may comprise a 200 Mbps Ethernet connection. Routing engine 26 maintains routing information that describes a topology of a network, and derives a forwarding information base (FIB) in accordance with the routing information. In general, the routing information represents the overall topology of the network. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF). In contrast, the FIB is generated based on selection of certain routes within the network and maps packet key information (e.g., destination information and other select information from a packet header) to one or more specific next hops and ultimately to one or more specific output interface ports of IFCs 31, 32. Routing engine 26 may generate the FIB in the form of a radix tree having leaf nodes that represent destinations within the network. U.S. Pat. No. 7,184,437 provides details on an exemplary embodiment of a router that utilizes a radix tree for route resolution, the contents of which is incorporated herein by reference in its entirety.

Routing engine 26 communicates data representative of a software copy of the FIB into each of PFEs 30 to control forwarding of traffic within the data plane. This allows the software FIB stored in memory (e.g., RAM) of in each of PFEs 30 to be updated without degrading packet-forwarding performance of router 20. In some instances, routing engine 26 may derive separate and different software FIBs for each respective PFEs 30. In addition, one or more of PFEs 30 include application-specific integrated circuits (ASICs 27) that PFEs 30 program with a hardware-copy of the FIB based on the software FIBs (i.e., hardware versions of the software FIBs) copied to each respective PFE 30.

ASICs 27 of PFEs 30 process packets by performing a series of operations on each packet over respective internal packet forwarding paths as the packets traverse the internal architecture of router 20. Operations may be performed, for example, on each packet based on any of a corresponding ingress interface, an ingress PFE 30, an egress PFE 30, an egress interface or other components of router 20 to which the packet is directed prior to egress, such as one or more service cards. PFEs 30 each include forwarding structures that, when executed, examine the contents of each packet (or another packet property, e.g., incoming interface) and on that basis make forwarding decisions, apply filters, and/or perform accounting, management, traffic analysis, and load balancing, for example. In one example, each of PFEs 30 arranges forwarding structures as next hop data that can be chained together as a series of "hops" along an internal packet forwarding path for the network device. In many instances, the forwarding structures perform lookup operations within internal memory of ASICs 27, where the lookup may be performed against a tree (or trie) search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs 27 determines the manner in which a packet is forwarded or otherwise processed by PFEs 30 from its input interface on one of IFCs 32 to its output interface on one of IFCs 32.

As described herein, the hardware FIBs within the forwarding ASICs 27 are dynamically programmed by control logic (e.g., a local processor) on PFEs 30 in accordance with the operating modes selected by the user or software agent by way of interaction with control unit 22. For example, upon selection of the first mode, routing engine 26 programs ASICs 27 of the forwarding plane to store the next hops within the FIB as a "flat" next hops. As such, utilization of flat next hops for forwarding structures within ASICs 27 may utilize more high-speed internal memory of the ASICs, but may be more amenable to fine-grain traffic monitoring and statistic generation by control logic within the ASIC or the local process of the PFE. Similarly, routing engine 26 may interact with PFEs 30 to dynamically reprogram ASICs 27 in accordance with the second mode of operation in which the next hop for each route or LSP is stored within the ASICs as composite next hops. As such, utilization of composite next hops for forwarding structures within ASICs 27 may utilize less high-speed internal memory of the ASICs. Control unit 22 of router 20 provides a user interface that allows the operator or network management software to seamlessly transition between the first mode in which flat next hops are used within the forwarding chips and the second mode in which composite next hops are used. For example, control unit 22 may dynamically program ASICs 27 to build the appropriate forwarding structures and incrementally transition certain routes to the desired forwarding constructs. In this way, control unit 22 may provide for reconfiguration of forwarding structures within ASICs 27, even wholesale changes in the manner in which operational forwarding structures are stored, with little or no disruption of packet forwarding or packet data loss.

Figure 3:
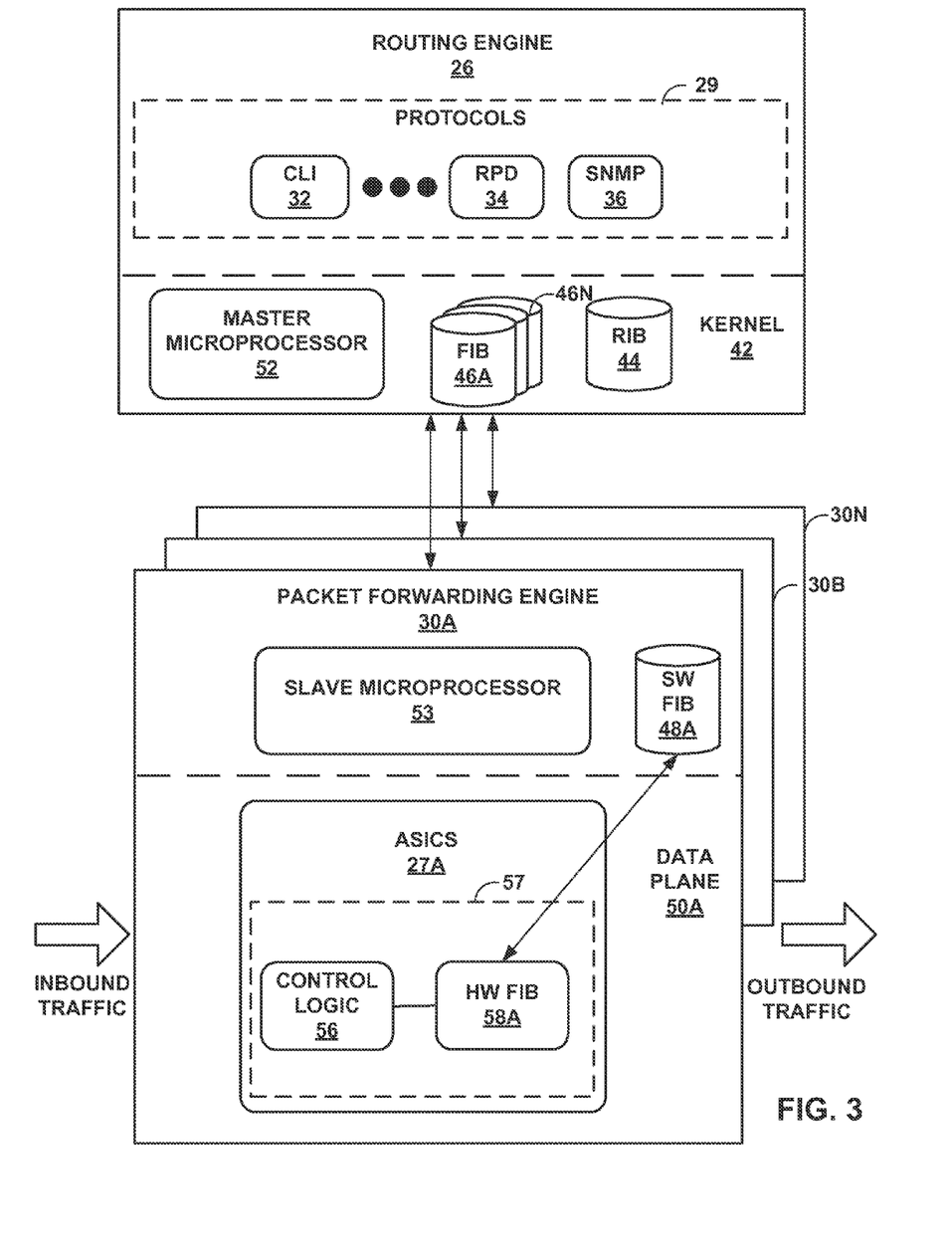
FIG. 3 is a block diagram illustrating a routing engine and a packet-forwarding engine of the router of FIG. 2 in further detail.

FIG. 3 is a block diagram illustrating a routing engine 26 and a packet-forwarding engine 30 of the router 20 of FIG. 2 in further detail. Routing engine 26 includes high-level, control plane software processes 29. In this example, software processes include command-line interface daemon 32 ("CLI 32"), routing protocol daemon 34 ("RPD 34"), and Simple Network Management Protocol daemon 36 ("SNMP 36"). In this respect, routing engine 26 may provide routing plane, service plane, and management plane functionality for router 20. Various instances of routing engine 26 may include additional software processes 29 not shown in FIG. 3 that perform other control, management, or service plane functionality and/or drive and otherwise manage data plane functionality for router 20.

RPD 34 interacts with kernel 42 (e.g., by way of API calls) to update routing information base (RIB) 44 based on routing protocol messages received by router 20. RPD 34 may, for example, execute various routing protocols, such as LDP and RSVP of establish LSPs within a network. RIB 44 may include information defining a topology of a network, including one or more routing tables and/or link-state databases. Kernel 43 executes on master microprocessor 52 and may comprise, for example, a UNIX operating system derivative such as Linux or Berkeley Software Distribution (BSD). Kernel 42 processes kernel calls from RPD 34 and generates forwarding information in the form of FIBs 46A-46N based on the network topology represented in RIB 44, i.e., performs route resolution. Typically, RPD 34 generates FIBs 46 in the form of radix or other lookup trees to map packet information (e.g., header information having destination information and/or a label stack) to next hops and ultimately to interface ports of interface cards associated with respective PFEs 30. Master microprocessor 52 of kernel 42 then programs PFEs 30 to install copies of the FIBs as software FIBs 48A-48N. Microprocessor 52 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Command line interface daemon 32 ("CLI 32") provides an interface by which an administrator or other management entity may modify the configuration of router 20 using text-based commands. Simple Network Management Protocol daemon 36 ("SNMP 36") comprises an SNMP agent that receives SNMP commands from a management entity to set and retrieve configuration and management information for router 20. Using CLI 32 and SNMP 36, management entities may enable/disable and configure services, install routes, enable/disable and configure rate limiters, and configure interfaces, for example. As described in detail below, RPD 34, CLI 32, and SNMP 36 configure router 20 to implement configured services, add/modify/delete routes, and otherwise modify packet forwarding paths by installing forwarding structures to PFEs 30.

In this example, ASICs 27 are microcode-controlled chipsets programmably configured by a slave microprocessor 53 executing on each of PFEs 30A-30N (e.g., PFE 30A). Specifically, one or more of ASICs 27 is controllable by microcode 57 programmed by slave microprocessor 53. The slave microprocessor 53 programs a hardware FIB 58A into internal memory of ASIC 27A within the data plane 50A based on software FIB 48A. When forwarding packets, control logic 56 traverses HW FIB 58A and, upon reaching a FIB entry for the packet (e.g., a leaf node), microcode-implemented control logic 56 automatically selects a forwarding next hop and processes the packets in accordance with the operations defined within the next hop.

In accordance with the techniques described herein, routing engine 26 dynamically reconfigures representations of FIB 58A used within ASIC 27A of the router. The forwarding structures of FIB 58A comprise a plurality of forwarding next hops associated with the routes of RIB 44 and are stored in a first representation within the forwarding unit. For example, the forwarding next hops may be stored as flat next hops within a programmable memory of the ASIC 27A, wherein each of the flat next hops store operations to be performed on the packets by the ASIC and none of the operations are shared by multiple ones of the flat next hops within the memory of the forwarding unit. As another example, the forwarding next hops may be stored as composite next hops within a programmable memory of the forwarding unit, wherein the composite next hops store operations to be performed on the packets by ASIC 27A and the operations are arranged within the memory of the ASIC as shared by the composite next hops. Processor 52 installs the forwarding structures within ASIC 27A by way of slave processor 53.

In response to input directing the router to change from a first operating mode to a second operating mode, e.g., by way of CLI 32 or SNMP 36 or input (an event) triggering an automatic response, processor 52 installs, within ASIC 27A, one or more new forwarding next hops that are associated with none of the routes currently associated with the forwarding structures of HW FIB 58A. Moreover, processor 52 directs ASIC 27A to store the new forwarding next hops in a second representation that is different from the first representation. After installing the new forwarding next hops within ASIC 27A, processors 52 directs ASIC 27A to update HW FIB 58A to associate at least one of the routes to the new forwarding next hop created within the ASIC's internal memory. This process may be repeated, in concurrent fashion, for some or all of the forwarding structures of HW FIB 58A. In this way, the representation for the forwarding next hop may be changed from a first representation to a second representation while PFE 30A and ASIC 27A continue to forward packets.

Figure 4:
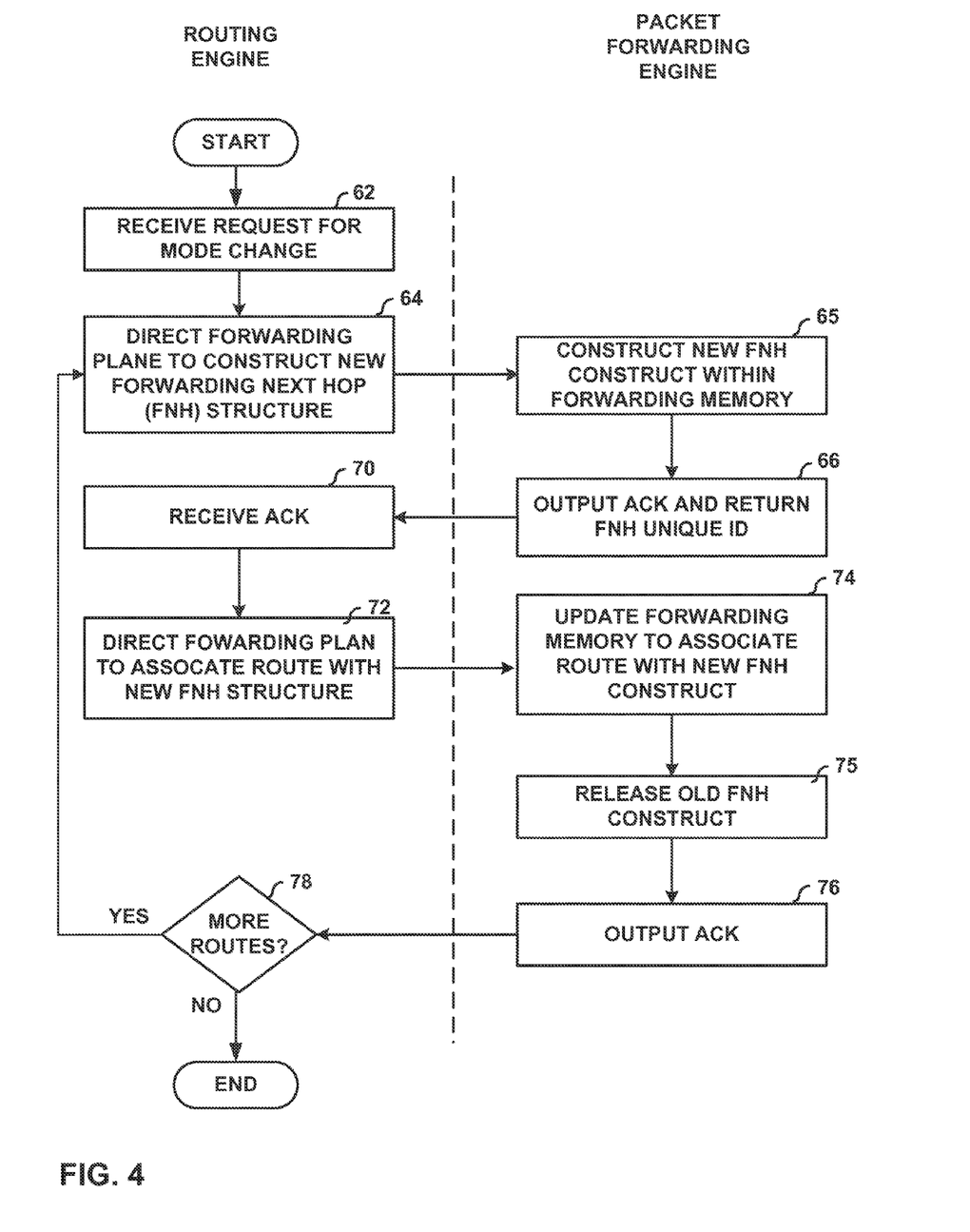
FIG. 4 is a flowchart illustrating example interaction between the routing engine and the packet forwarding engine when dynamically transitioning from one type of construct to a different type of construct for storing forwarding structures.

FIG. 4 is a flowchart illustrating example interaction between kernel 42 of routing engine 26 and slave microprocessor 53 of packet forwarding engine 30 when dynamically transitioning from one type of construct to a different type of construct for storing forwarding structures within hardware FIB 58A of ASIC 27A while continuing to forward packets.

Initially, routing engine 26 receives input directing the router to change operating modes, i.e., to change to utilization of a different representation of forwarding structure supported by ASICs 27(62). For example, the input may be received by way of a command entered by CLI 32 or a SNMP protocol 36 in accordance with a command syntax supported by router 20. As another example, the input may be an event that results in routing engine 26 automatically changing to a different utilization for the forwarding structures.

In response, kernel 42 identifies any effected routes within FIB 46 and, for each route, outputs a message via communication link 34 to direct one or more of PFEs 30 to construct a specific type of forwarding structure in accordance with the new representation (64). For example, kernel 42 may output a message directing PFE 30A to construct a forwarding next hop arranged as a flat next hop, i.e., where none of the chained operations defining the next hop are shared in memory with other next hops. As another example, kernel 42 may output a message directing PFE 30A to construct a forwarding next hop arranged as a composite next hop, i.e., where one or more of the chained operations defining the next hop are shared with other next hops within the packet forwarding memory of ASIC 27A.

Upon receiving the message, local slave microprocessor 53 processes the message and constructs one or more new forwarding next hops within internal memory of ASIC 27A in accordance with the requested representation (65). At this point, the new forwarding next hops are not associated with any routes serviced by the forwarding information within ASIC 27A.

Upon constructing the forwarding construct, slave microprocessor 53 outputs an acknowledgement to kernel 42 that the structure has been created and is ready for use within ASIC 27A (66). At this time, slave microprocessor 53 may include a unique handle or other identifier for the forwarding structure. During this time, ASIC 27A continues to forward traffic using existing forwarding next hops since any new structure has not been associated with one or more routes.

Upon receiving the acknowledgement (70), slave microprocessor 53 outputs a message specifying one or more routes and the unique identifier for the new forwarding construct, where the message directs slave microprocessor 53 to update hardware FIB 58A to associate the specified routes with the forwarding construct associated with the unique identifier (72).

Upon receiving the message, local slave microprocessor 53 processes the message and updates hardware FIB 58A such that keying information for the specified routes is ultimately resolved to the new forwarding next hops (74). Slave microprocessor may, for example, update a leaf node or other portion of a radix tree representation of FIB 58A to include a reference or pointer to the newly created forwarding next hops within memory of ASIC 27A, thereby associating the routes with the new forwarding next hops. In this way, this atomic operation of ASIC 27A may be utilized to immediately redirect traffic associated with the one or more routes with the new forwarding construct for the next hop operations to be applied to the packet. As such, packet loss may be reduced or minimized. Upon updating FIB 58A, slave microprocessor 53 may release the old forwarding construct from ASIC 27A, thereby freeing up any memory associated with the construct (75). In addition, slave microprocessor 53 outputs an acknowledgement to kernel 42 indicating that the one or routes specified by the message have been successfully migrated to the new forwarding structure within ASIC 27A (76).

Kernel 42 applies the process described in FIG. 4 until all routes affected by the change request have been updated (78). Although shown sequentially in FIG. 4 for ease of illustration, the process of constructing a new forwarding structure and transitioning one or more routes to that forwarding structure may be performed in parallel or pipelined fashion between routing engine 26 and one or more packet forwarding engines 30.

Figure 5A:
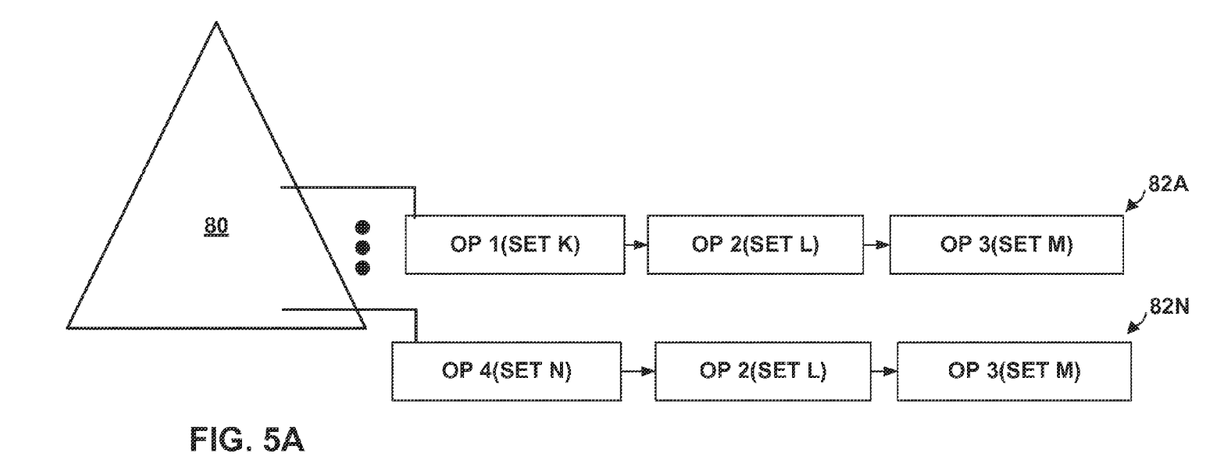
FIGS. 5A, 5B are block diagrams illustrating example forwarding structures of a forwarding path of a network device.
Figure 5B:
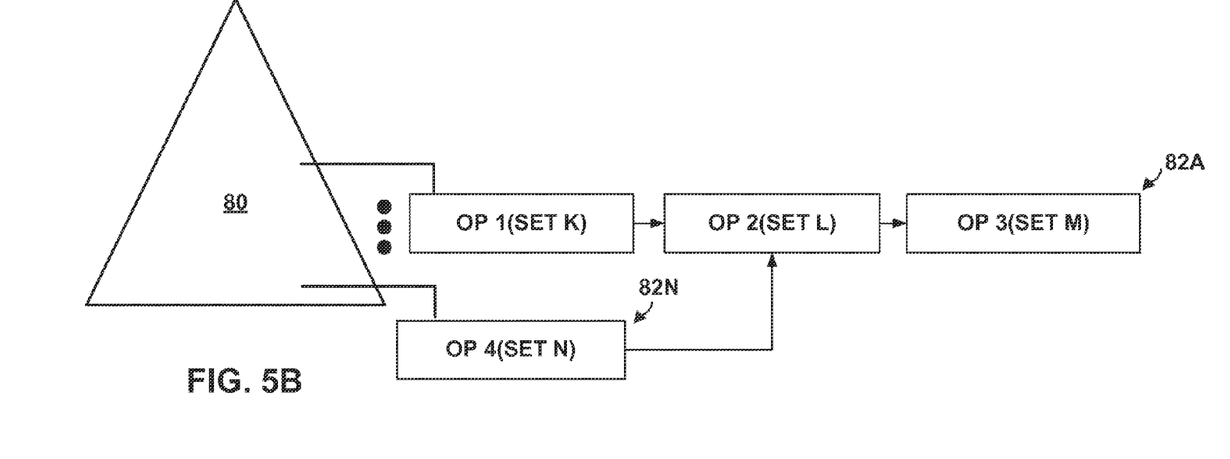

FIGS. 5A, 5B are block diagrams illustrating example forwarding structures of a forwarding path installed within packet forwarding ASIC 27A. The example of FIG. 5A illustrates forwarding information 80 arranged as a radix tree having route resolution leaf nodes, such as a leaf node that resolves routes to a forwarding next hop 82A. Packet forwarding ASIC 27A processes packets to identify packet properties and perform actions bound to the properties. ASIC 27A may execute microcode (or "microinstructions") to control and apply fixed hardware components to process packet "keys." A packet key includes packet fields and other parameters that determine a flow of packet processing for the packet along an internal forwarding path. Internal forwarding path of the ASIC 27A stores forwarding information 80 and comprises programmable, executable microcode and fixed hardware components that determine the packet processing actions and other operations. The forwarding path may include, for example, executable instructions, programmable logic, and application-specific logic that perform lookups, rate limit packet flows, and manipulate packet keys, among other functions.

As shown in the example of FIGS. 5A and 5B, each forwarding next hop 82A-82N includes a chained set of primitives or operations ("OPs") that corresponds to packet key values and bind values to actions to be performed by ASIC 27A. As shown in this example, the sequence of operations for each next hop are enumerated (e.g., OP 1, OP 2, etc), and each operation receives and processes a set of entities, such as inputs or values specified by the explicit encoding in the forwarding-structures on which the operations are being performed. In this example, the first operation of next hop 82A of FIGS. 5A, 5B operates on a set of entities (e.g., set K), the second operation processes a set of entities (e.g., set L), and the third process a set of entities (e.g., set M). Further, the first operation of next hop 82N of FIGS. 5A, 5B (e.g., OP 4) operates on another set of entities (e.g., set N), the second operation processes a set of entities (set L), and the third process a set of entities (set M). In this respect, each operation within a forwarding next hop represents a tightly-coupled combination of executable instructions that correspond to bound actions and of data for possible packet key values. A tree lookup operation, for example, may direct ASIC 27A to perform a longest-match prefix lookup in a routing table or search a list of prefixes in a filter program. A label swapping operation associated with a route for an LSP (e.g., LSP 17 of FIG. 1) may direct ASIC 27A to remove an outer label from the packet and insert a specific label in its place. As another example, another operation may define alternative operations for label swapping in the event traffic is to be redirected to a backup LSP, such as to backup LSPs 17' instead of primary LSPs 17. Other examples operations next hop functions include policing (i.e., rate limiting), counting, and sampling. While illustrated within ASICs 27, the primitives may be stored in memory external to ASIC 27A onboard PFE 30A.

In this manner, actions of the forwarding path use the next hop data structures of FIGS. 5A and 5B to initiate and control packet processing. At the end of each processing step, the result of one operation is a next operation that may specify additional processing or the termination of processing, for instance. Additional information regarding next hops and next hop chaining is available in PLATFORM-INDEPENDENT CONTROL PLANE AND LOWER-LEVEL DERIVATION OF FORWARDING STRUCTURES, U.S. application Ser. No. 12/266,298, filed Nov. 6, 2008, which is incorporated herein by reference in its entirety.

In the example of FIG. 5A, the chained set of forwarding next hops 82A-82N are stored as flat next hops in which each of the flat next hops store operations to be performed on the packets by the ASIC 27A and none of the operations are shared by multiple ones of the flat next hops within the memory of the ASIC. That is, no operations are shared between forwarding next hops. This allows policing and traffic monitoring operations to be individually applied, e.g., by way of specialized operations within a given forwarding next hop. In contrast, FIG. 5B illustrates a second example, in which forwarding information 80 resolves to forwarding next hops 82 that are stored as composite next hops. As composite next hops, the operations defined for forwarding next hops 82 within the forwarding path of ASIC 27A may be shared between forwarding next hops. For example, the second and third operations of next hops 82A, 82N that perform the same operations on the same entities have been shared between the next hop forwarding structures. As such, utilization of memory within ASIC 27A may be reduced.

Various embodiments of the invention have been described. These and other embodiments are within the scope of the following claims.

The invention claimed is:

1. A method comprising:

installing, within a forwarding unit of a router, forwarding structures for forwarding packets in accordance with routing information for a set of routes through a network, wherein the forwarding structures comprise a plurality of forwarding next hops associated with the routes, and wherein the forwarding next hops are stored in a first representation within the forwarding unit;

while forwarding the packets with the forwarding unit in accordance with the forwarding structures, installing, within the forwarding unit, one or more new forwarding next hops that are not associated with any routes by the forwarding structures and are stored within the forwarding unit in a second representation that is different from the first representation, the second representation comprising composite next hops; and after installing the new forwarding next hops within the forwarding unit, updating the forwarding structures to associate at least one of the routes of the set of routes to the new forwarding next hops;

wherein the forwarding next hops and the new forwarding next hops specify operations to be performed on the packets by the forwarding unit, wherein, for the at least one of the routes, the forwarding next hops in the first representation and the new forwarding next hops in the second representation specify the same operations to be performed on the packets, and wherein, for at least one of the routes, the operations for the composite next hops are arranged in a memory of the forwarding unit as shared by multiple ones of the composite next hops such that some operations in the first representation are linked differently in the memory of the forwarding unit than the same operations in the second representation.

2. The method of claim 1, wherein installing forwarding structures comprises installing the forward data structures to comprise forwarding next hops in the first representation as flat next hops within the memory of the forwarding unit, wherein each of the flat next hops store operations to be performed on the packets by the forwarding unit and none of the operations are shared by multiple ones of the flat next hops within the memory of the forwarding unit.

3. The method of claim 1, wherein installing forwarding structures comprises installing the forward data structures to comprise forwarding next hops in the first representation as composite next hops within the memory of the forwarding unit, wherein the composite next hops store operations to be performed on the packets by the forwarding unit and the operations are arranged within the memory of the forwarding unit as shared by multiple ones of the composite next hops.

4. The method of claim 1, further comprising, after updating the forwarding structures to associate the at least one route with the new forwarding next hops, directing the forwarding unit to discard one of the forwarding next hops previously associated with the at least one of the routes.

5. The method of claim 1, further comprising:

outputting a message from a routing engine to the forwarding unit to direct the forwarding unit to install the one or more new forwarding next hops in the second representation;

in response to the message, installing the one or more forwarding next hops in the second representation by executing operations within the forwarding unit to create the one or more new forwarding next hops within an internal memory of the forwarding unit in accordance with the second representation;

outputting an acknowledgement message from the forwarding unit to the routing engine upon creating the one or more new forwarding next hops within the internal memory of the forwarding unit; and outputting a message from the routing engine to direct the forwarding unit to update the forwarding structures to associate at least one of the routes to the new forwarding next hops only upon receiving the acknowledgment from the forwarding unit that the new forwarding next hops have been created in the internal memory of the forwarding unit.

6. The method of claim 1, further comprising:

receiving an input directing the router to change from a first operating mode in which the forwarding structures in the forwarding unit are stored in the first representation to a second operating mode in which the forwarding structures in the forwarding unit are stored in the second representation; and in response to the input to change from the first operating mode to the second operating mode, installing the one or more new forwarding next hops in the forwarding unit and updating the forwarding structures to associate at least one of the routes to the new forwarding next hops while continuing to forward packets with the forwarding unit.

7. The method of claim 6, further comprising:

repeatedly and concurrently, installing a plurality of new forwarding next hops in the forwarding unit and updating different portions of the forwarding structures to associate routes for the different portions of the forwarding structures to the new forwarding next hops until all of the forwarding structures in the forwarding unit are stored in the second representation while continuing to forward packets with the forwarding unit.

8. A router comprising:

a forwarding unit to forward packets in accordance with forwarding structures programmed into a memory in accordance with routing information for routes through a network, wherein the forwarding structures comprise a plurality of forwarding next hops associated with the routes and stored in a first representation within the forwarding unit;

a control unit having a processor to install the forwarding structures within the forwarding unit, wherein, in response to input directing the router to change from a first operating mode to a second operating mode, the control unit installs, within the forwarding unit, one or more new forwarding next hops that are associated with no routes by the forwarding structures and are stored in a second representation within the forwarding unit that is different from the first representation, the second representation comprising composite next hops, and, after installing the new forwarding next hops, updates the forwarding structures to associate at least one of the routes to the new forwarding next hops;

wherein the forwarding next hops and the new forwarding next hops specify operations to be performed on the packets by the forwarding unit, wherein, for the at least one of the routes, the forwarding next hops in the first representation and the new forwarding next hops in the second representation specify the same operations to be performed on the packets, and wherein, for at least one of the routes, the operations for the composite next hops are arranged in the memory of the forwarding unit as shared by multiple ones of the composite next hops such that some operations in the first representation are linked differently in the memory of the forwarding unit than the same operations in the second representation.

9. The router of claim 8, wherein forwarding next hops in the first representation are stored within the memory of the forwarding unit as flat next hops, wherein each of the flat next hops store operations to be performed on the packets by the forwarding unit and none of the operations are shared by multiple ones of the flat next hops within the memory of the forwarding unit.

10. The router of claim 8, wherein forwarding next hops in the first representation are stored within the memory of the forwarding unit as composite next hops, wherein the composite next hops store operations to be performed on the packets by the forwarding unit and the operations are arranged within the memory of the forwarding unit as shared by the composite next hops.

11. The router of claim 8, wherein the control unit is configured to, after updating the forwarding structures to associate the at least one route with the new forwarding next hop, direct the forwarding unit to discard one of the forwarding next hops previously associated with the at least one of the routes.

12. The router of claim 8,
wherein the forwarding unit outputs an acknowledgement message from the forwarding unit to the routing engine upon creating the one or more new forwarding next hops within the memory, and
wherein the routing engine outputs a message to direct the forwarding unit to update the forwarding structures to associate at least one of the routes to the new forwarding next hops only upon receiving the acknowledgment from the forwarding unit that the new forwarding next hops have been created in the internal memory of the forwarding unit.

13. The router of claim 8, wherein the input comprises an event triggers that triggers an automatic change from the first operating mode to the second operating mode.

14. A non-transitory computer-readable storage medium comprising instructions that, when executed by a processor, cause the processor to:

install, within a forwarding unit of a router, forwarding structures for forwarding packets in accordance with a routing information for routes through a network, wherein the forwarding structures comprises a plurality of forwarding next hops associated with the routes that specify operations to be performed on the packets by the forwarding unit, and wherein the operations of the forwarding next hops are stored in a first representation within the forwarding unit;

install, within the forwarding unit, one or more new forwarding next hops that are not associated with any routes by the forwarding structures, wherein operations specified by the new forwarding next hops to be performed on the packets are stored in a second representation within the forwarding unit that is different from the first representation, the second representation comprising composite next hops; and after installing the new forwarding next hop within the forwarding unit, update the forwarding structures to associate at least one of the routes to the new forwarding next hops;

wherein, for the at least one of the routes, the forwarding next hops in the first representation and the new forwarding next hops in the second representation specify the same operations to be performed on the packets, and wherein, for at least one of the routes, the operations for the composite next hops are arranged in a memory of the forwarding unit as shared by multiple ones of the composite next hops such that some operations in the first representation are linked differently in the memory of the forwarding unit than the same operations in the second representation.

15. The non-transitory computer-readable storage medium of claim 14, wherein the operations include label swapping operations to be performed by the forwarding unit on the packets.

16. The non-transitory computer-readable storage medium of claim 14, wherein the operations are instructions executable by the forwarding unit.

\* \* \* \* \*